United States Patent [19]

Teraoka

[11] 4,433,766
[45] Feb. 28, 1984

[54] BI-DIRECTIONAL OVERRUNNING CLUTCH

[75] Inventor: Masao Teraoka, Sano, Japan

[73] Assignee: Tochigi-Fuji Sangyo Kabushiki Kaisha, Tochigi, Japan

[21] Appl. No.: 323,709

[22] Filed: Nov. 20, 1981

Related U.S. Application Data

[63] Continuation of Ser. No. 47,804, Jun. 11, 1979, abandoned.

[51] Int. Cl.³ .................. F16D 21/08; F16D 41/06; F16D 41/22
[52] U.S. Cl. .................................. 192/50; 192/93 A; 403/1
[58] Field of Search ............ 192/31, 50, 54, 93 A; 403/1

[56] References Cited

U.S. PATENT DOCUMENTS

| 1,141,839 | 6/1915 | Settergren | 192/50 |
| 2,001,931 | 5/1935 | Lyman | 192/31 X |
| 2,009,964 | 7/1935 | Mottlav | 192/93 A X |
| 2,662,624 | 12/1953 | Giffen | 192/54 X |
| 3,656,598 | 4/1972 | Goble | 192/50 X |
| 4,213,521 | 7/1980 | Modersohn | 192/54 X |
| 4,262,785 | 4/1981 | Anderson et al. | 192/54 X |

FOREIGN PATENT DOCUMENTS

| 343204 | 2/1920 | Fed. Rep. of Germany | 192/50 |
| 28018 | of 1908 | United Kingdom | 192/50 |

Primary Examiner—W. Carter Reynolds
Attorney, Agent, or Firm—Wenderoth, Lind & Ponack

[57] ABSTRACT

A bi-directional overrunning clutch comprises a drive shaft for transmitting a rotational driving force, a drive clutch member which is rotated with the drive shaft, a driven clutch member in engagement with the drive clutch to receive rotational motion thereof and movable axially to transmit the rotational motion to a hub, and a brake member to impart a desired braking force to rotational movement of the driven clutch member. In a two wheel running mode, the driven clutch member is disengaged from the hub so that the driving force, which is received by a non-driven wheel from the road surface, is limited to the wheel only.

5 Claims, 3 Drawing Figures

F I G. 1
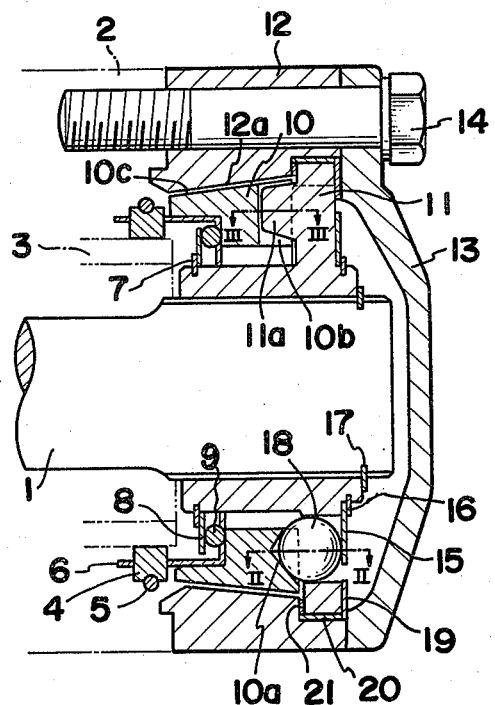
F I G. 2
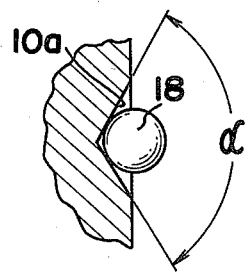
F I G. 3
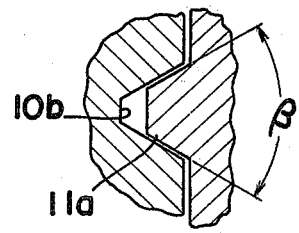

BI-DIRECTIONAL OVERRUNNING CLUTCH

This is a continuation of application Ser. No. 47,804, filed June 11, 1979 now abandoned.

BACKGROUND OF THE INVENTION

The present invention relates to bi-directional overrunning clutches for vehicles and more particularly to such a bi-directional overrunning clutch used in a front hub portion of a four wheel drive vehicle.

In a two wheel drive running condition of a four wheel drive vehicle, a wheel not driven, for example the front wheel, is driven from the road surface by contact thereof with the road surface. In this condition, since the driving force or rotation of the wheel is also transmitted to various mechanisms ancillary to the front wheel, i.e. mechanisms employed for a four wheel running mode, the running efficiency is decreased by the resistance of bearings and of oil. In order to improve such efficiency, means need be provided for limiting the driving force received from the road surface to the wheel and preventing transmission thereof to such other mechanisms.

It is therefore an object of the present invention to provide a bi-directional overrunning clutch which in a two wheel running condition can limit the driving force which is received by a non-driven wheel from the road surface to that wheel only.

It is a further object of the present invention to provide a bi-directional overrunning clutch in a four wheel drive condition can effectively transmit the driving force of the drive shaft to the drive wheel.

It is another object of the present invention to provide a bi-directional overrunning clutch for a four wheel drive which can offer an extremely high running efficiency.

BRIEF DESCRIPTION OF THE INVENTION

In accordance with the present invention, a bi-directional overrunning clutch comprises a drive shaft for transmitting a rotational driving force, a drive clutch member which is rotated by rotational motion of the drive shaft, a driven clutch member in engagement with the drive clutch member to receive rotational motion thereof and movable axially to transmit such rotational motion to a hub, and a brake member to impart a desired braking force to axial movement of the driven clutch member.

BRIEF DESCRIPTION OF THE DRAWINGS

The aforementioned and other objects and features of the present invention shall be described hereinafter in detail with reference to preferred embodiments thereof shown in the accompanying drawings, wherein:

FIG. 1 is a cross sectional view illustrating a preferred embodiment of the present invention;

FIG. 2 is a cross sectional view taken along the line II—II in FIG. 1; and

FIG. 3 is a cross sectional view taken along the line III—III in FIG. 1.

DETAILED DESCRIPTION OF THE INVENTION

FIG. 1 is an explanatory view of the construction of a clutch in accordance with the present invention, and showing a drive shaft aligned in an axial direction. Referring to FIG. 1, the reference numeral 1 designates the drive shaft, and 11 is a drive clutch member. The mode of operation of the drive shaft is selectable between force transmitting rotation and a stationary state that does not transmit force. The drive clutch member 11 is secured to the drive shaft 1 through a snap ring 17, the clutch member thus being assembled with the drive shaft 1 to become integral therewith. The numeral 2 designates a hub, 12 a housing, and 13 a cover, which are assembled together by means of a bolt 14. An inner peripheral surface 12a of the housing has a conical shape so as to enable frictional engagement between the inner peripheral surface 12a and a driven clutch member 10. The driven clutch member 10 is provided to transmit power of the drive clutch member 11 to the housing 12 (hub 2), and is provided with a connection between the housing 12 and the drive clutch member 11. That is, an outer peripheral surface 10c of the driven clutch member 10 has a conical shape to allow for frictional engagement with the inner peripheral surface 12a of the housing 12. On the other hand, the connection between the driven clutch member and the drive clutch member 11 also includes a ball-cam clutch and a conical-cam clutch. The ball-cam clutch is provided in that the driven clutch member 10 has formed therein a recess with a conical configuration to form a a cut portion 10a, the drive clutch member 11 has a cylindrical flange portion facing an axial end of driven clutch member 10, with an opening in such flange portion facing the cut portion 10a, and a ball 18 is positioned in such opening and is biased into contact with cut portion 10a by means of a belleville spring 15 supported in drive clutch member 11 by a snap ring 16. The conical-cam clutch shape is formed in that a cam portion 11a having a substantially conical configuration protrudes axially upwardly from the flange portion of the drive clutch member 11, and a substantially V-shaped groove 10b is formed by cutting in the end face of the driven clutch member 10 to receive cam portion 11a. As shown in FIG. 2, the conical angle $\alpha$ of cut portion 10a is greater than the conical angle $\beta$ of the cam portion 11a and the V-shaped groove 10b, as shown in FIG. 3, taken in directions circumferentially of driven clutch member 10. A brake indicated at 4 is supported on a brake holder 6 secured to the driven clutch member 10 and is biased to a fixing system 3 by means of a ring-like spring 5. A belleville spring indicated at 8 is partly supported by means of a snap ring 7 mounted on the drive clutch member 11 to bias the driven clutch member 10 axially towards the flange portion of the drive clutch member 11. The reference numeral 20 designates a slide bearing, and 19 and 21 designate washers.

The operation of the clutch construction as mentioned above will be described hereinafter.

When the drive shaft 1 is at a standstill, the driven clutch member 10 is moved axially toward the drive clutch member 11 by the belleville spring 8, i.e. to an inoperative position. This releases a connection between the outer peripheral surface 10c of the driven clutch member 10 and the inner peripheral surface 12a of the housing 12 to provide no power transmission. That is, even if the hub 2 is rotated, the housing 12 secured to the hub 2 and the cover 13 merely rotate, and a great load is not imposed on the hub 2. Next, when the drive shaft 1 commences its rotation, the drive clutch member 11 also rotates. Since the driven clutch member 10 is biased towards the drive clutch member 11 by the belleville spring 8 and is thus in a connected state due to the connection of the ball-cam clutch power is transmitted to the driven clutch member 10. The the the driven clutch members 10 thus commences rotation against the resistance of the brake 4. Rotation of the driven clutch member 10 facilitates movement of the driven clutch member 10 axially of drive shaft 1, to the left as shown in FIG. 1, i.e. to an operative position, by action of the ball 18 and cut portion 10a. This axial movement results in frictional connection between the outer peripheral surface 10c of the driven clutch member 10 and the inner peripheral surface 12a of the housing 12 so that rotation of the driven clutch member 10 is transmitted to the hub 2. When the torque of the drive shaft 1 assumes a magnitude above a certain value, the ball 18 is urged to the right as shown in FIG. 1 and moves against the force of the belleville spring 15. At such time, the connection of the conical cam clutch performs the function of transmitting power by urging driven clutch member 10 leftwardly as shown in FIG. 1.

When the power of the drive shaft 1 is cut off, rotation of the driven clutch member 10 is immediately slowed down by the action of the brake 4 of the driven clutch member 10, and the rightward biasing force of the belleville spring 8 acts on the driven clutch member 10 to reduce the connecting force between the driven clutch member 10 and the housing 12, thus relieving the load on the hub 2.

In other words, first and second engagement structures are provided between drive clutch member 11 and driven clutch member 10 for transmitting rotational movement of drive clutch member 11 to driven clutch member 10 and for, upon rotation of drive clutch member 11, moving driven clutch member 10 axially to an operative position against the force of spring 8. The first engagement device is particularly shown in FIG. 2 and includes a surface of cut portion 10a which is inclined circumferentially of driven clutch member 10, and a surface of ball 18 which is urged against the surface of cut portion 10a by spring 15. The second engagement device is particularly shown in FIG. 3 and includes a surface of groove 10b which is inclined circumferentially of driven member 10 and an inclined surface of cam portion 11a which is inclined circumferentially of the drive clutch member 11. The angle of inclination of the surface of cut portion 10a is greater than the angle of inclination of the surfaces of groove 10b and cam portion 11a. Therefore, upon rotation of drive member 11, such rotation being transmitted via ball 18 to driven member 10 as the ball moves circumferentially along cut portion 10a, the axially directed force component of ball 18 acting against driven member 10 will be greater than the axially directed force component imparted by cam portion 11a against driven clutch member 10. As a result, the axial movement of driven clutch member 10 to the operative position in contact with hub 12 will first be due substantially the first engagement device of FIG. 2. Thereafter, when ball 18 is urged to the right to deflect spring 15, i.e. out of contact with the surface of cut portion 10a, the second engagement device of FIG. 3 will continue to urge the driven clutch member 10 axially to the operative position.

It should be appreciated from the foregoing description that the transmission of torque from the drive clutch member 11 to the driven clutch member 10 may be suitably transferred suquentially from the ball-cam clutch to the conical-cam clutch by selecting the angles α and β to be within desired ranges. However, if the ball 18 is selected to have a size so that physical properties as desired may be provided in view of the entire structure, only the ball-cam clutch will suffice without provision of the conical-cam clutch. In addition, if the brake resistance and cam angle are selected suitably, only the conical-cam clutch will suffice without provision of the ball-cam clutch.

What I claim is:

1. A bi-directional overrunning clutch, particularly for use in a hub drive assembly wherein the hub is selectively freely rotatable or positively driven, said clutch comprising:

drive shaft means selectively operationally in a driving mode and rotating to transmit a rotational driving force and in a non-driving mode to interrupt said rotational driving force;

a drive clutch member fixedly assembled on said drive shaft means to rotate therewith during said driving mode thereof;

a driven clutch member positioned to receive rotational movement from said drive clutch member during said driving mode of said drive shaft means, said driven clutch member being mounted for relative axial movement with respect to said drive clutch member and said drive shaft means between an operative position axially spaced from said drive clutch member and an inoperative position axially adjacent said drive clutch member;

said driven clutch member having surface means for drivingly engaging the hub when said driven clutch member is in said operative position thereof and for transmitting said rotational movement from said drive clutch member to the hub;

means for urging said driven clutch member to said inoperative position thereof such that said surface means is out of engagement with the hub;

said drive clutch member and said driven clutch member having therebetween separate first and second engagement means for transmitting said rotational movement of said drive clutch member to said driven clutch member and for, upon rotation of said drive clutch member, moving said driven clutch member to said operative position against the force of said urging means;

said first engagement means comprising a first pair of cam surfaces including a surface of said driven clutch member inclined circumferentially of said driven clutch member and a surface of an element associated with said drive clutch member;

said second engagement means comprising a second pair of cam surfaces including surfaces on said driven clutch member and said drive clutch member inclined circumferentially of said driven clutch member and said drive clutch member;

the angle of said inclined surface of said driven clutch member of said first pair of cam surfaces being greater than the angle of said inclined surfaces of said driven clutch member and said drive clutch member of said second pair of cam surfaces, taken in directions circumferentially of said driven clutch member and said drive clutch member, and said first pair of cam surfaces being in contact when said driven clutch member is in said inoperative position thereof, such that said first and second pairs of cam surfaces are sequentially operable to maintain said driven clutch member in said operative position thereof during said drive mode of said drive shaft means; and said driven clutch member including brake means for, upon interruption of said driving mode of said drive shaft means, retarding continued rotation of said driven clutch member and enabling said urging means to move said driven clutch member to said inoperative position thereof.

2. A clutch as claimed in claim 1, wherein said inclined surface of said driven clutch member of said first engagment means is formed by a conical recess formed in said driven clutch member, and said element of said first engagement means comprises a ball mounted in said drive clutch member and extending into said conical recess.

3. A clutch as claimed in claim 2, wherein said first engagement means further comprises means for biasing said ball into said conical recess, such that upon rotation of said drive clutch member, said ball moves circumferentially along the surface of said conical recess and simultaneously transmits said rotational movement to said driven clutch member and axially moves said driven clutch member to said operative position thereof.

4. A clutch as claimed in claim 1 or claim 2, wherein said inclined surfaces of said second pair of cam surfaces of said second engagement means are formed by a radially extending substantially V-shaped recess formed in said driven clutch member, and a substantially conical projection extending from said drive clutch member into said V-shaped recess.

5. A clutch as claimed in claim 1, wherein said surface means of said driven clutch member comprises a conical surface adapted to frictionally engage a complementary shaped conical surface of the hub.

* * * * *